United States Patent [19]

Schmidt

[11] Patent Number: 5,277,449
[45] Date of Patent: Jan. 11, 1994

[54] TRANSPORT DEVICE

[76] Inventor: Peter Schmidt, Ziegeleiweg 20, 5000 Köhn 90, Fed. Rep. of Germany

[21] Appl. No.: 879,321

[22] Filed: May 7, 1992

[30] Foreign Application Priority Data

May 8, 1991 [DE] Fed. Rep. of Germany ....... 4115075

[51] Int. Cl.⁵ .............................................. B62B 1/04
[52] U.S. Cl. ................................ 280/655; 280/47.26; 280/652
[58] Field of Search ............... 280/639, 651, 652, 655, 280/47.17, 47.18, 47.24, 47.26, 47.315

[56] References Cited

U.S. PATENT DOCUMENTS

| | | | |
|---|---|---|---|
| 2,431,834 | 4/1944 | Sinclair | 280/47.26 |
| 2,992,011 | 7/1961 | Becan | 280/47.26 |
| 3,166,339 | 1/1965 | Earley | 280/47.26 |
| 4,261,596 | 4/1981 | Douglas | 280/652 |

FOREIGN PATENT DOCUMENTS 416965 1/1967 Switzerland.

Primary Examiner—Richard M. Camby
Attorney, Agent, or Firm—Ostrolenk, Faber, Gerb & Soffen

[57] ABSTRACT

A transport device has a transport container which is movable over the ground and on which a push-or-pull bar and wheels can be fastened, the transport contained having, in operating condition, two bottom surfaces which are inclined at an angle to each other and extend transversely to a vertical longitudinal central plane lying in the direction of movement and are connected to each other at their lower end by a connecting surface, the transport container being formed by two substantially identical half shells. The half-shells (1, 2) are pivotally connected to each other in the region of the connecting surface (1b, 2b) via a shaft (10a) which extends perpendicular to the longitudinal center plane and they are movable between a position swung against each other and the swung-apart operating position. In the operating position, the half-shells form a hollow space which is open on top and into which a valise-like container (50) having an outer shape adapted to the shape of the hollow space can be inserted 15 Claims, 4 Drawing Sheets

TRANSPORT DEVICE

BACKGROUND OF THE INVENTION

The present invention relates to transport devices and, more particularly, to transport devices of the type which are movable over the ground and to which push or pull bars and wheels can be fastened.

In many cases it is necessary to transport relatively heavy objects, for example travel articles, over long distances, which is fatiguing due to the heavy weight of such articles.

For this reason, it is already known to provide valises with casters and a pull bar so that the user can move these valises by pulling them or pushing them. Another disadvantage of such transport devices is that, regardless of whether they are full or empty, they take up a relatively large amount of space.

In the performing of many types of sports, it is also necessary to transport heavy and bulky athletic equipment over long distances. In order to facilitate the transporting of this athletic equipment, various transport devices have been developed which, in most cases, are designed specifically for a given sport.

Thus, for instance, transport devices are known for the transporting of skis (Federal Republic of Germany OS 34 39 278) which consist of a support member into which the ends of the skis, laid flat against each other, are clamped. The support member has skids on one side and casters on the opposite side so that the ends of the skis can slide or roll on smooth ground.

A transport device for ski equipment is also known (U.S. Pat. No. 4 358 137) in which the transport container is formed of a carriage which is provided with two wheels and to the lower end of which there is fastened a transport bag which can be rolled together and closed along one lengthwise side by a slide fastener. Carrying loops are provided on the transport guide, making it possible for the user to pull or push the carriage. The carriage furthermore has an insertion opening for the lower ends of the skis into which the skis can be loosely inserted and surrounded as a whole by the transport bag, within which ski boots and possibly ski poles can also be arranged. The manufacture of this known transport device is relatively expensive and furthermore the moving of this known transport device over the ground is relatively difficult since the holding grips which are fastened to the transport bag are not rigidly connected to the carriage. Furthermore, the moving of this transport device over soft snow is not possible since, in such case, the wheels sink in and impede movement.

A transport device is also known for golf clubs (Federal Republic of Germany OS 25 28 968) in which a pull or push bar is surrounded by annular holding elements for the golf clubs and which has movable wheels on its lower end for the rolling of the transport device. Although this transport device is collapsible after removal of the wheels and a part of the pull bar, it takes up considerable space when not in use, which is all the more disadvantageous since this transport device, in the same way as all of the transport devices described above, can be used only for one specific sport and thus several transport devices are required when various different sports are played.

SUMMARY OF THE INVENTION

The object of the present invention is to provide a transport device of simple construction of the aforementioned type for the convenient transporting of many different types of articles without it taking up a large amount of space when not in use.

The foregoing and other objects are achieved in accordance with the present invention by a transport device which includes a transport container which is movable over the ground and to which a push or pull bar and wheels can be fastened. The transport container is formed by two substantially identical half-shells which are pivotally connected with each other by a shaft. The half-shells are movable between a position swung against each other and an operating position in which they are swung apart. In the operating position, the half-shells form a hollow space which is open towards the top and into which a valise-like container having an outer shape adapted to the shape of the hollow space can be inserted.

The development of the transport device in accordance with the invention results in convenient and universal handling for the transporting of the most different types of articles, the two half-shells and possibly also the valise-like container taking up only a small amount of space when collapsed.

As a result of the bottom surfaces which are inclined to each other by an angle of, for instance, 90° or less, it is possible to stand the transport container on one bottom surface, whereupon the other bottom surface is substantially vertical and lengthy articles such as, for instance skis, which are inserted into the holding channel adjacent to this vertically standing bottom surface are vertical without there being any danger of the transport container tipping over. This is true in particular when heavy items of athletic equipment such as, for instance ski boots, are contained in the transport container since, in such case, the center of gravity of the transport device, including all of the athletic articles, is very low.

By the rounded or triangular shape of the bottom surfaces and of the connecting surface connecting them together, it is possible to move the transport container over both firm ground and soft ground, for instance snow, since the bottom of the transport container, which is formed by the connecting surface and/or the bottom surfaces, forms a skid.

By the development of the transport container in the form of two identical half-shells which are connected together by the shaft serving to receive the wheels, a very simple manufacture from, for instance, plastic material is possible.

The pull/push bar preferably consists of two sections which are telescopically insertable one within the other.

In all cases, the pull or push bar has a handle on one end and on the other end a transverse part the ends of which are rotatably mounted in openings developed in the side walls of a holding channel, detachable detent means permitting a locking of the push and pull bar in a predetermined angular position with respect to the transport container.

When this pull or push bar is not used, it can possibly be inserted into the holding channel after the two sections of the pull bar have been pushed together.

The pull or push bar can furthermore be set at such an angle with respect to the transport container that the handle lies on the floor so that the transport container is supported in the desired position.

Other features and advantages of the present invention will become apparent from the following description of the invention which refers to the accompanying drawings.

DESCRIPTION OF THE PREFERRED EMBODIMENT

Figure 2:
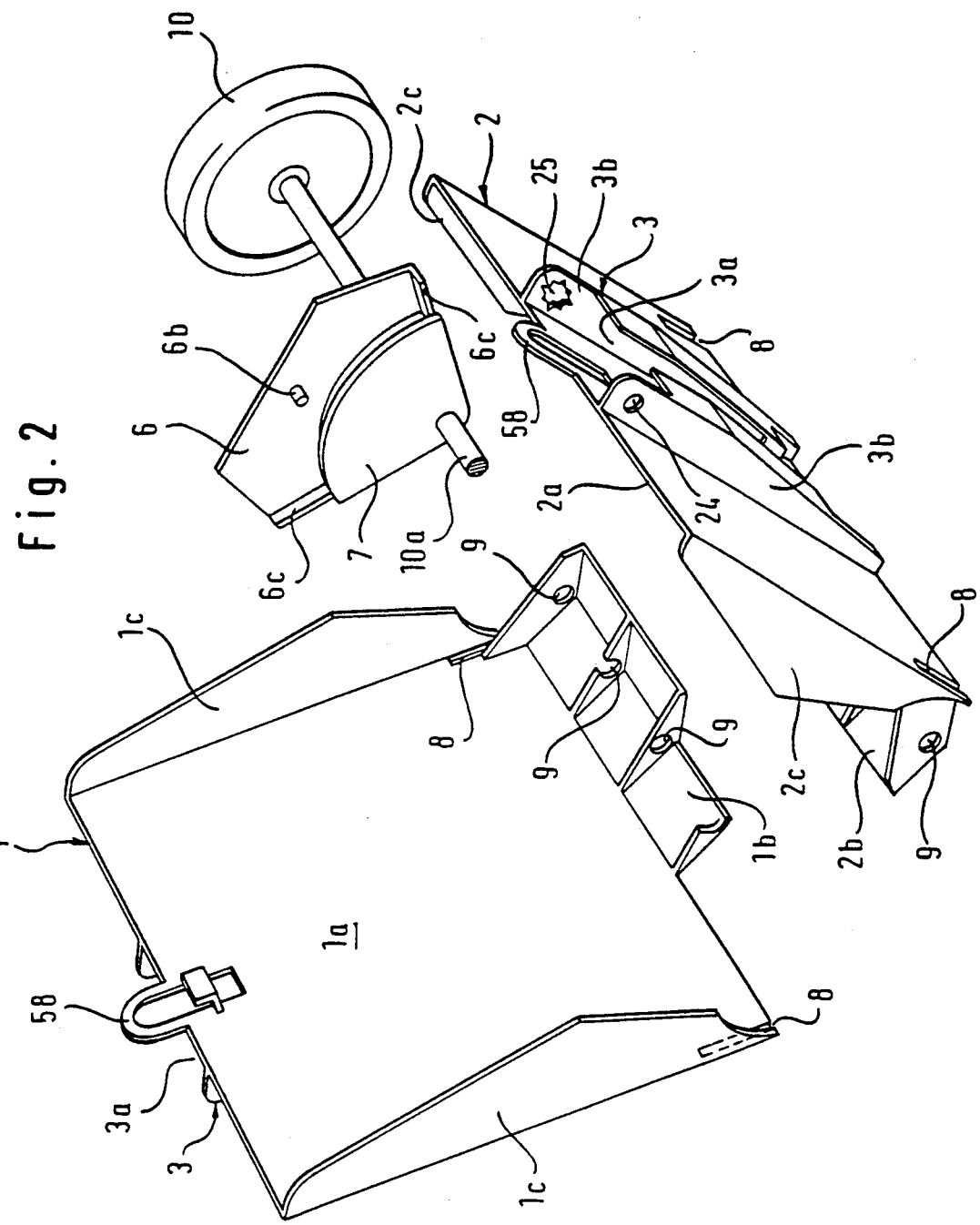
FIG. 2 is an exploded view, partially broken away, of the transport container of FIG. 1.
Figure 3:
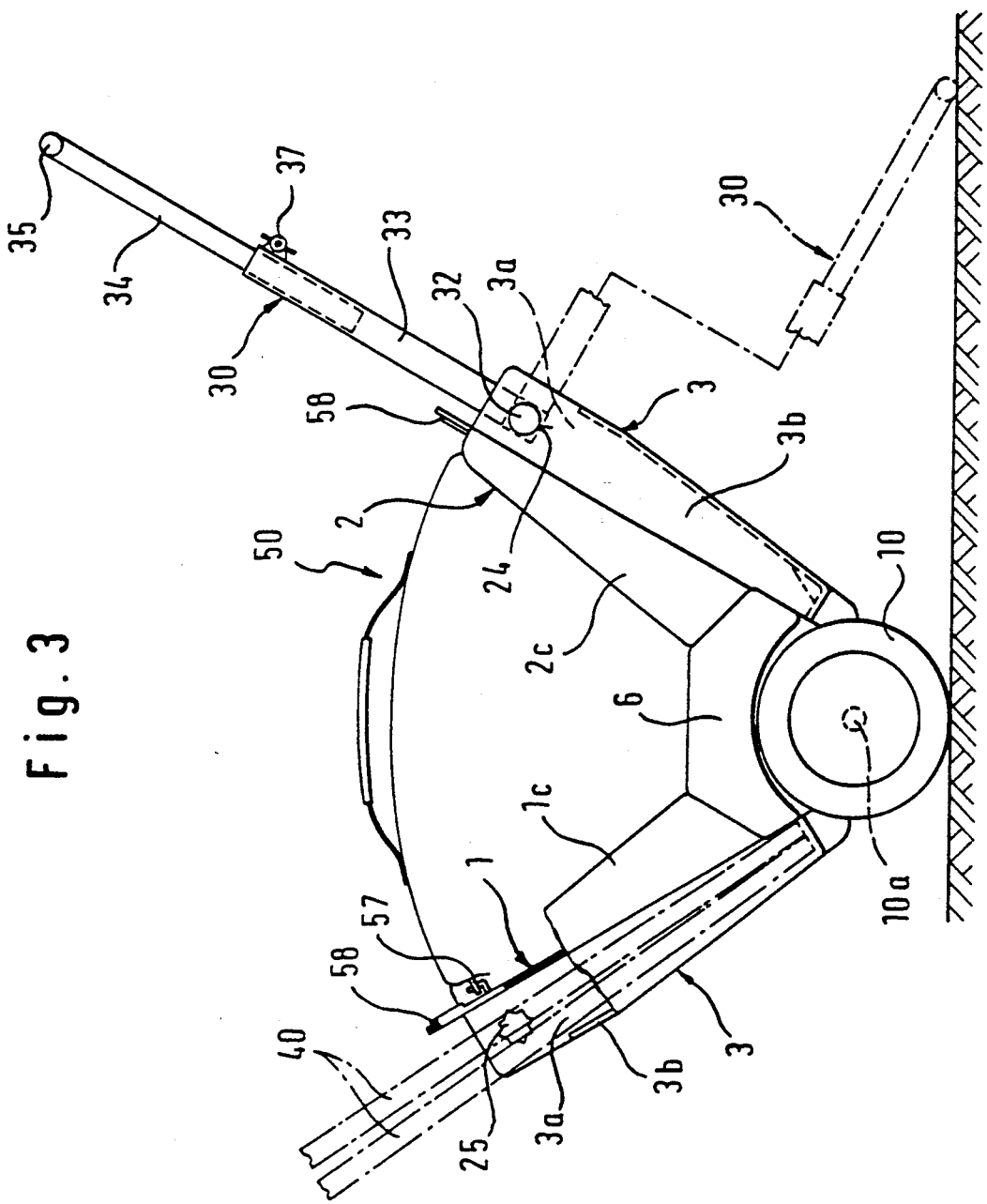
FIG. 3 is a side view of the transport container.
Figure 4:
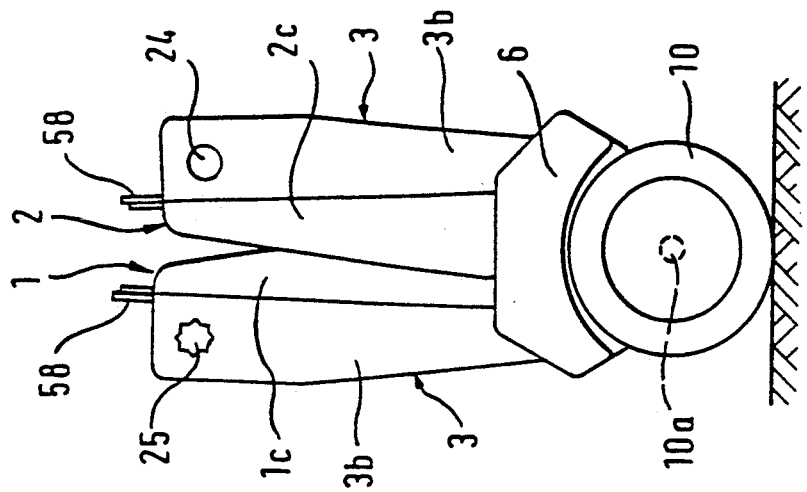
FIG. 4 is a side view of the transport container in its collapsed condition.
Figure 5:
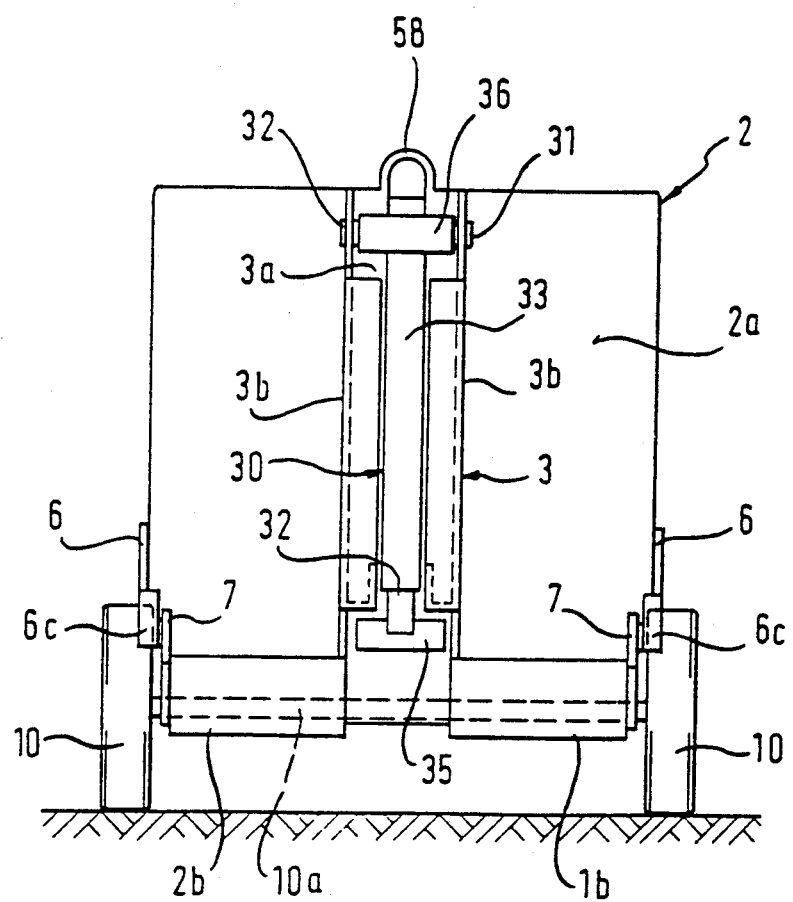
FIG. 5 is an end view of the transport container with the pull and push bar swung against it.

Referring now to the drawings, FIGS. 1 to 5 show an embodiment of the transport device which has a transport container formed by two identical half-shells 1, which are pivotally connected to each other via a shaft 10a so that the transport container can be collapsed after removal of the valise-like container, as shown in FIG. 4. The transport container takes up only a small amount of space when collapsed.

Referring now to FIG. 2, in its position of use, the transport container has two bottom surfaces 1a, 2a of the half-shells 1 and 2 which are inclined to each other at an angle of preferably about or somewhat less than 90°, the bottom surfaces being connected to each other by a lower connecting surface which is formed by individual parts 1b, 2b of the corresponding half-shells 1, 2, which together form the connecting surface.

The bottom of the transport container formed by the bottom surfaces 1a, 2a and the connecting surfaces 1b, 2b forms a slide skid which permits easy sliding of the transport container on snow, soft sand or the like. Furthermore, on the ends of the shaft 10a which extend beyond the transport container, there are provided two laterally arranged wheels 10 which are detachably fastened by suitable means, such as detent devices, to the shaft 10a.

As can be noted in particular from FIGS. 2 and 3, holding channels 3 are developed adjacent the bottom walls 1a, 2a of the transport container, into which channels long articles 40 such as, for instance skis or other athletic articles, can be inserted. As can be noted from FIGS. 2 and 3, these holding channels 3 terminate in insertion openings 3a within the region of the upper edges of the half shells 1, 2.

Figure 1:
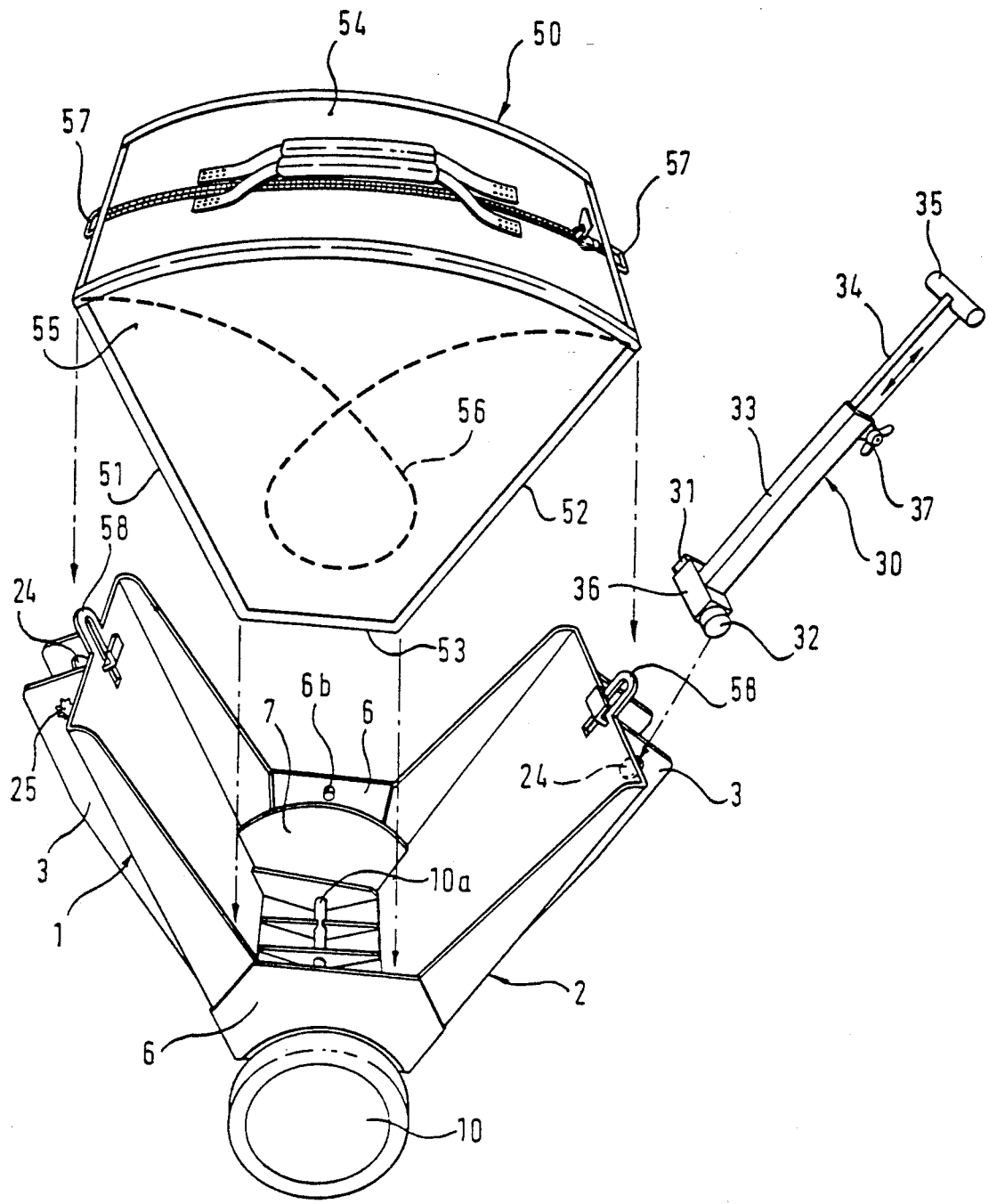
FIG. 1 is a perspective view of one embodiment of the transport device.

As seen in FIG. 1, in the embodiment described, a push and pull bar 30 comprises pull-bar sections 33, 34 which can be telescopically introduced one into the other and can be swung up into the inside of the adjacent holding channel 3 in collapsed condition, when not in use. The pull-bar section 33 is provided on its end adjacent the other section of the pull bar with locking devices 37, merely diagrammatically indicated, which permit the two pull-bar sections to be locked together in the operating condition. Depending on the dimensions desired for the transport container and the pull bar, the latter may possibly also be developed in a single piece.

The pull-bar section 34 is provided on its free end with a handle 35, while the free end of the pull-bar section 33 is provided with a transverse part 36 which bears pins 31, 32 respectively on its two ends. The pin 32 is of round cross section and engages into a round hole 24 developed in a side wall 3b of the holding channel 3, being rotatably mounted therein, as can be noted in particular from FIG. 3. The hole 25 in the other side wall 3a of the holding channel 3, as best seen in FIG. 2, is of polygonal shape, such as results for instance by two squares arranged one above the other at an angle of 45° to each other. The other pin 31 can, in this case, either be square or have a shape which is adapted to the shape of the hole 25 so that this pin can be locked in a plurality of detent positions within the hole 25. For this purpose, the pin 31 can have a cylindrical extension at its outer end and be so pretensioned by means of tensioning devices which are arranged between the pin 32 and the associated side wall 3b adjacent the inside of the hole 34 that the polygonal section of the pin 31 is urged into the hole 25. In this way, it is possible to swing the push-and-pull bar into the different positions shown diagrammatically in FIG. 3 as well as into the inward swung position shown in FIG. 5 within the corresponding holding channel. Furthermore, the push-and-pull bar 30 can serve, in the position shown in dash line in FIG. 3, to support the transport container in a predetermined position.

As can be noted in particular from FIG. 2, the connecting-surface parts 1b, 2b are integral with the bottom surfaces 1a, 2a of the half-shells 1, 2 and extend over a part of the width of the half shells 1, 2, as seen in the direction of the shaft 10a, in such a manner that they supplement each other so as to form the connecting surface when the two half shells are connected to each other via the shaft 10a.

In order to obtain a more pleasing appearance, there is also provided on the shaft 10a a disk 7 which is arranged on the inside of side parts 1c, 2c of the half-shells 1, 2 and can extend through slots 8 in the bottom walls 1a, 2a when the two half-shells 1, 2 are swung together. On the outside of the side parts 1c, 2c there can be another cover plate 6 which bears a centering pin 6b which, in the collapsed condition, comes between the side parts 1c, 2c of the half-shells 1, 2 and centers plate 6 with respect to the half-shells in the collapsed condition of the transport container. This plate 6 can furthermore serve to limit the swinging apart of the half-shells 1, 2 in the manner that this plate is provided with bends 6c which, when the half-shells are not swung together, come into engagement with the outsides of the bottom surfaces 1a, 2a and limit the movement of the half shells 1, 2 away from each other.

The shaft 10a extends through holes 9 in ribs of the connecting-surface parts 1b, 2b so that no additional bearing means are required.

The two half-shells are thus of identical shape and can be easily made from plastic.

The development of the valise-like container 50 can be noted in particular from FIG. 1. Corresponding to the shape of the two half-shells when swung apart from each other, this valise-shaped container has bottom surfaces 51, 52 which are connected to each other at the lower end by a connecting surface 53. At the upper end, the bottom surfaces 51, 52 are connected to each other by a cover surface 54 and the side regions are closed by side walls 55. Both the side walls 55 and the cover surface 54 are preferably foldable, i.e. formed of deformable material which can be folded, for instance, in the manner of an accordion so that the valise-shaped container 50 as such can also be collapsed. In order to keep the valise-shaped container 50 in folded open condition, a spring element having a dead point is arranged adjacent to the side walls 55, which element, after a dead-center path has been overcome starting from the collapsed condition of the bottom surfaces 51, 52 of the container 50, urges the bottom surfaces apart and thus brings them into the shape shown in FIG. 1.

In order to be able to lock the valise-like container 50 to the two half-shells, locking devices 57, 58, which preferably engage one within the other, are provided on the upper ends of the bottom walls 51, 52 of the container 50 and the half-shells 1, 2 respectively.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A transport device for transporting a valise-like container over a surface, comprising a transport container for holding the valise-like container, the transport container being formed by two substantially identical half-shells having respective lower connecting surfaces; means including a shaft having opposed ends for pivotally connecting the half-shells with each other in the region of their connecting surfaces, such that the half-shells are movable between a position swung against each other and an operating position in which they are swung apart, the half-shells being shaped such that in the swung apart position, they form a hollow space which is open towards the top and into which the valise-like container can be inserted, the valise-like container having a shape corresponding to the shape of the transport container in the swung-apart position, the valise-like container having two bottom surfaces which are inclined at an angle to each other and are connected together by a connecting surface at their lower end and by a cover surface at their upper end and having side walls arranged between the bottom surfaces, the connecting surface and the cover surface, the side walls and the cover surface being deformable so that the bottom surfaces can be swung together;
 - a holding channel located on and extending substantially parallel to an outer surface of each half-shell; and
 - the transport container having a bottom formed by the connecting surfaces of the half-shells such that the bottom forms a slide skid.

2. A transport device according to claim 1, further including a spring tensioning device within the valise-like container adjacent to the side walls, the spring tensioning device having a dead point and holding the valise-like container in the swung-apart position after an opening movement past the dead point.

3. A transport device according to claim 2, further including latch parts on the upper ends of the bottom surfaces of the valise-like container and corresponding latch parts on the upper ends of the half-shells which cooperate with the latch parts on the upper end of the valise-like container.

4. A transport device according to claim 1 wherein the holding channel of each half-shell receives one end of long articles to be transported, each holding channel having an opening at its upper end through which the articles may be inserted.

5. A transport device according to claim 4 wherein a wheel is detachably fastened to each end of the shaft connecting the half shells.

6. A transport device for transporting an object over a surface, comprising a transport container for holding the object, the transport container being formed by two substantially identical half-shells having respective lower connecting surfaces; means including a shaft having opposed ends for pivotally connecting the half-shells with each other in the region of their connecting surfaces, such that the half-shells are movable between a position swung against each other and an operating position in which they are swung apart, the half-shells being shaped such that in the swung apart position, they form a hollow space which is open towards the top and into which the object can be inserted;
 - a holding channel located on and extending substantially parallel to an outer surface of each half-shell, the holding channel of each half-shell receiving one end of long articles to be transported, each holding channel having an opening at its upper end through which the articles may be inserted;
 - the transport container having a bottom formed by the connecting surfaces of the half-shells such that the bottom forms a slide skid; and
 - a push-or-pull bar, one end of which bears a handle while the other end bears a transverse part, the holding channel including a pair of opposite side walls each of which includes a hole for mounting the ends of the transverse part.

7. A transport device according to claim 6, wherein the push-or-pull bar is of a length which corresponds substantially to the length of the holding channels and is mounted to a holding channel such that it can be swung into such holding channel.

8. A transport device according to claim 6, wherein the push-or-pull bar is formed by at least two pull-bar sections which are telescopically insertable one within the other, the push-or-pull bar in its pushed-together condition having a length corresponding essentially to the length of a holding channel and being mounted to a holding channel such that it can be swung into such holding channel.

9. A transport device according to claim 8, wherein one of the holes in the side walls of each holding channel is round while the other hole has a polygonal shape, one end of the transverse part bearing a round pin which is in engagement with the round hole and the other end of the transverse part bearing a polygonal pin which can be engaged in the hole in a plurality of relative positions of the push-or-pull bar with respect to the holding channel, the transverse part being axially displaceable in its longitudinal direction between the holes so that the polygonal pin comes into and out of engagement with the polygonal hole, the transport device further including a spring-tensioning device for pressing the polygonal pin into engagement with, the hole.

10. A transport device according to claim 9, wherein the object is a valise-like container having a shape corresponding to the shape of the transport container in the swung-apart position, the valise-like container having two bottom surfaces which are inclined at an angle to each other and are connected together by a connecting surface at their lower end and by a cover surface at their upper end, and having side walls arranged between the bottom surfaces the connecting surface and the cover surface, the side walls and the cover surface being deformable so that the bottom surfaces can be swung together.

11. A transport device according to claim 10, further including a spring tensioning device within the valise-like container adjacent to the side walls, the spring tensioning device having a dead point and holding the valise-like container in swung-apart condition after an opening movement past the dead point.

12. A transport device according to claim 11, further including latch parts on the upper ends of the bottom surfaces of the valise-like container and corresponding latch parts on the upper ends of the half shells which cooperate with the latch parts on the upper end of the valise-like container.

13. A transport device for transporting a valise-like containing over a surface, comprising a transport container for holding the valise-like container, the transport container being formed by two substantially identical half-shells having respective lower connecting surfaces; means including a shaft having opposed ends for pivotally connecting the half-shells with each other in the region of their connecting surfaces, such that the half-shells are movable between a position swung against each other and an operating position in which they are swung apart, the half-shells being shaped such that in the swung apart position, they form a hollow space which is open towards the top and into which the valise-like container can be inserted, the valise-like container having a shape corresponding to the shape of the transport container in the swung-apart position, the valise-like container in the swung-apart position, the inclined at an angle to each other and are connected together by a connecting surface at their lower end and by a cover surface at their upper end and having side walls arranged between the bottom surfaces, the connecting surface and the cover surface, the side walls and the cover surface being deformable so that the bottom surfaces can be swung together; and the transport container having a bottom formed by the connecting surfaces of the half-shells such that the bottom forms a slide skid.

14. A transport device according to claim 13, further including a spring tensioning device within the valise-like container adjacent to the side walls, the spring tensioning device having a dead point and holding the valise-like container in their swung-apart position after an opening movement past the dead point.

15. A transport device according to claim 13, further including latch parts on the upper ends of the bottom surfaces of the valise-like container and corresponding latch parts on the upper ends of the half-shells which cooperate with the latch parts on the upper end of the valise-like container.

* * * * *